United States Patent

Woodgate et al.

[11] Patent Number: 5,936,031
[45] Date of Patent: Aug. 10, 1999

[54] PREPARATION OF POLYALKYLSILSESQUIOXANE PARTICLES

[75] Inventors: Paul E. Woodgate, Spencerport; Peter J. Makarewicz; Todd C. Zion, both of Rochester, all of N.Y.

[73] Assignee: Eastman Kodak Company, Rochester, N.Y.

[21] Appl. No.: 09/016,072

[22] Filed: Jan. 30, 1998

[51] Int. Cl.$^6$ ............... C08G 77/06; C08K 5/54; C08K 5/41
[52] U.S. Cl. ............ 524/745; 524/837; 528/14; 528/21
[58] Field of Search ............ 528/14, 21; 524/745, 524/837

[56] References Cited

U.S. PATENT DOCUMENTS

| | | | |
|---|---|---|---|
| 4,528,390 | 7/1985 | Kimura | 556/450 |
| 4,892,726 | 1/1990 | Yonekura et al. | 524/63 |
| 5,149,748 | 9/1992 | Shimizu et al. | 525/477 |
| 5,232,611 | 8/1993 | Ohashi et al. | 428/447 |
| 5,393,330 | 2/1995 | Chen et al. | 106/2 |
| 5,789,517 | 8/1998 | Ochiai et al. | 528/21 |
| 5,801,262 | 9/1998 | Adams | 556/450 |
| 5,827,921 | 10/1998 | Osawa et al. | 524/837 |

FOREIGN PATENT DOCUMENTS

54/72300  6/1979  Japan .

*Primary Examiner*—Vasu Jagannathan
*Assistant Examiner*—Callie E. Shosho
*Attorney, Agent, or Firm*—Harold E. Cole

[57] ABSTRACT

A process for preparing polyalkylsilsesquioxane particles comprising:
  a) dissolving a surfactant in an alkyltrialkoxysilane or its partially hydrolyzed condensate;
  b) combining the mixture with water; and
  c) adding a basic material to the mixture to obtain the polyalkyisilsesquioxane particles.

20 Claims, No Drawings

PREPARATION OF POLYALKYLSILSESQUIOXANE PARTICLES

FIELD OF THE INVENTION

This invention relates to a method for preparing polyalkylsilsesquioxane particles which have a narrow particle size distribution.

BACKGROUND OF THE INVENTION

It is well known in the thermal printing art that particles can be used in thermal media to keep the thermal print head free of dirt and debris. The particles are preferably small inorganic particles used in a slipping layer of a dye-donor element and the abrasive action of the particles cleans the thermal print head during the printing operation. Polymethylsilsesquioxane particles, such as Tospearl® (Toshiba Silicone Co.), have been proposed for use in thermal media as described in copending U.S. Application Ser. No. 081976,772 of Simpson et al., filed Nov. 24, 1997. However, these particles have a very broad particle size distribution

DESCRIPTION OF RELATED ART

Japanese Kokai 54/72300 discloses a process for preparing polymethylsilsesquioxane particles wherein methyltrialkoxysilane and/or its partial hydrolysate is hydrolyzed and condensed in an aqueous solution of an alkaline earth metal hydroxide or an alkali metal carbonate. U.S. Pat. No. 4,528,390 relates to a method for preparing particles of polymethylsilsesquioxane wherein methyltrimethoxy-silane, or its partially hydrolyzed condensate, is added to a stirred aqueous solution of a base, such as ammonium hydroxide.

However, there is a problem with these prior art processes in that the polyalkylsilsesquioxane particles obtained have a very broad particle size distribution. These oversize particles are too large for use in thermal media in order to clean a thermal print head. Before these particles can be used in thermal media, the size of the particles has to be reduced by a grinding operation. Such a grinding operation adds to the manufacturing cost.

It is an object of this invention to provide a process for preparing polyalkylsilsesquioxane particles which have a narrow particle size distribution. It is another object of this invention to provide a process for preparing polyalkylsilsesquioxane particles having a median diameter of less than about 5 μm without a grinding step.

SUMMARY OF THE INVENTION

These and other objects are achieved in accordance with this invention which relates to a process for preparing polyalkylsilsesquioxane particles comprising:

a) dissolving a surfactant in an alkyltriaoxysilane or its partially hydrolyzed condensate;

b) combining the mixture with water, and c) adding a basic material to the mixture to obtain the polyalkylsilsesquioxane particles.

DESCRIPTION OF THE PREFERRED EMBODIMENTS

It has been found unexpectedly that the method of the invention for making polyalkylsilsesquioxane particles has an improved monodispersity over that of the prior art.

The alkyltrialkoxysilanes employed in the invention may be, for example, methyltriethoxysilane, ethyltrimethoxysilane, ethyltriethoxysilane, propyltrimethoxysilane, propyltriethoxysilane, methyltripropoxysilane, methyltributoxysilane, etc. In a preferred embodiment of the invention, the alkyltrialkoxysilane is a methyltrialkoxysilane such as methyltrimethoxysilane.

Methyltrialkoxysilanes or their partially hydrolyzed condensates which are used as starting materials in the invention may be obtained by alkoxylation of methyltrichlorosilane with suitable alcohols according to conventional procedures. A variety of methyltrialkoxysilanes is obtained depending upon the particular alcohols used in the alkoxylation. Additionally, partially hydrolyzed condensates of these methyltrialkoxysilanes, which are obtained by hydrolyzing the silanes in the presence of less water than a stoichiometric quantity, can be used.

The surfactants employed in the invention are any surface active materials soluble in the alkyltialkoxysilane. Examples of such surface active agents include anionic, cationic, and nonionic surface active agents, which may be used alone or in combination with one another. Anionic surfactants are preferred, such as sulfosuccinates and alkyl aryl polyether sulfonates. Sulfosuccinates include the ditridecyl ester of sodium sulfosuccinate (Aerosol TR® manufactured by Cytec Industries, Inc.), the dioctyl ester of sodium sulfosuccinate (Aerosol OT®), the dihexyl ester of sodium sulfosuccinate (Aerosol MA®), the diamyl ester of sodium sulfosuccinate (Aerosol AY®), and the dibutyl ester of sodium sulfosuccinate (Aerosol IB®). In a preferred embodiment, the sulfosuccinate is the dioctyl ester of sodium sulfosuccinate. Unwanted agglomeration in the process is minimized by the surfactant so that an improved particle dispersity is obtained. The amount of surfactant employed in the invention may range, for example, from about 0.1 to about 50 wt. %, preferably from 1 to about 30 wt. %, of the alkyltrialkoxysilane or its partially hydrolyzed condensate employed.

The basic materials employed in the invention may be materials such as ammonia; amines such as monomethylamine, dimethylamine, monoethylamine, diethylamine, ethylenediamine etc.; metal hydroxides, such as calcium hydroxide, magnesium hydroxide, sodium hydroxide, potassium hydroxide, etc.; or metal carbonates such as sodium carbonate, calcium carbonate, etc. In a preferred embodiment, the basic material is ammonia or a metal hydroxide or carbonate such as sodium hydroxide or sodium carbonate. The concentration of basic material employed in the solution is at least about 0.01%, preferably from about 0.01% to about 1 wt %.

In the process of the invention, the basic material acts as a catalyst for the hydrolysis and condensation of the alkyltrialkoxysilane.

The particles obtained using this invention have a narrower particle size distribution than those obtained by the prior art. As used herein, the median diameter is defined as the median of the volume distribution of the particles. In general, the particles obtained by the process of the invention have a median diameter of less than about 20 μm, preferably less than about 5 μm. In another preferred embodiment of the invention, less than about 30% of the particles have a diameter of >1.7 times the median diameter. In another preferred embodiment of the invention, the particles have a median diameter of less than about 0.7 μm and less than about 30% of the particles have a diameter of >1.2 μm.

Preferably, the hydrolysis-condensation reaction of the invention is conducted under heating, since the reaction time can thereby be reduced to obtain the desired product more readily. The heating temperature can be varied broadly depending upon the amount of alkyltrialkoxysilane or its partially hydrolyzed condensate employed. The heating temperature employed affects both the particle size and narrowness of the distribution obtained. Generally, the heating temperature may be raised up to the boiling point of the reaction mixture.

When the reaction is conducted under the conditions as described above, a precipitate of polyalkylsilsequioxane separates out as the reaction proceeds. The precipitate is optionally collected, washed with water, and dried or purified and isolated by other techniques to remove excess base and surfactant to give the desired product.

The polyalkylsilsesquioxane particles made by the process of the invention preferably are spherical or nearly spherical in shape. In a preferred embodiment of the invention, the polyalkylsilsesquioxane particles are polymethylsilsesquioxane particles.

The following examples are provided to illustrate the invention.

EXAMPLES

Example 1—Use of Ammonium Hydroxide

In a covered beaker, 48 g of Aerosol OT® were dissolved in 600 g of methyl-trimethoxysilane (Aldrich Co.). The solution was combined with 6 L of water (deionized) and homogenized in a Gaulin Homogenizer and then placed in a 12 L flask equipped with a paddle stirrer. The mixture was rapidly stirred for 10 minutes at 20° C. While stirring the mixture, 40 g of a 28% ammonium hydroxide solution was added all at once, and the resulting mixture was stirred overnight From this were obtained polymethylsilsesqiioxane particles. The particle size distribution was analyzed using a Microtra® Ultrafine Particle Analyzer, model # 9230-0-00-1. The particle size distribution was 10% less than 0.4 $\mu$m, 50% less than 0.6 $\mu$m, and 90% less than 0.8 $\mu$m.

Example 2—Comparative Example

Polyalkylsilsesquioxane particles were made in accordance with the procedure described in U.S. Pat. No. 4,528,390. In a 1 L flask equipped with a paddle stirrer were placed 500 g of water and 50 g of a 28% ammonium hydroxide solution. Over a 50 minute period at 25® C., 200 g of methyltrimethoxysilane were added. After the addition, the mixture was heated to 80° C. and stirred for two hours. From this were obtained a broad distribution of agglomerated polymethylsilsesquioxane particles.

Example 3—Use of Sodium Carbonate

In a covered beaker, 9 g of Aerosol OT® were dissolved in 100 g of methyltrimethoxysilane (Aldrich Co.). The solution was combined with 1 L of water (deionized) and placed in a 3 L flask equipped with a paddle stirrer. The mixture was rapidly stirred for 10 minutes at 50° C. While stirring the mixture, 20 ml of a 5% sodium carbonate solution was added all at once, and the resulting mixture was stirred for 1 hour. From this were obtained polymethylsilsesquioxane particles. The particle size distribution was analyzed using a Microtrac® ultrafine particle analyzer. The particle size distribution was 10% less than 0.4 $\mu$m, 50% less than 0.6 $\mu$m, and 90% less than 0.8 $\mu$m.

Example 4—Use of Sodium Carbonate

In a covered beaker, 9 g of Aerosol OT® were dissolved in 300 g of methyltrimethoxysilane. The solution was combined with 1.5 L of water (deionized) and homogenized in a Gaulin Homogenizer and then placed in a 3 L flask equipped with a paddle stirrer. The mixture was rapidly stirred for 10 minutes at 20° C. While stirring the mixture, 20 ml of a 2.5% sodium carbonate solution was added all at once, and the resulting mixture was stirred over night From this were obtained polymethylsilsequioxane particles. The particle size distribution was analyzed using a Microtrac® ultrafine particle analyzer. The particle size distribution was 10% less than 2.6 $\mu$m, 50% less than 3.6 $\mu$m, and 90% less than 5.1 $\mu$m.

Example 5—Use of Sodium Hydroxide

In a covered beaker, 8g Aerosol OT® were dissolved in 100 g methyltrimethoxysilane. This solution was added to 1,000 g filtered, distilled water in a 2L flask equipped with paddle stirrer. The mixture was heated to 50® C. With rapid stirring, 0.8 g sodium hydroxide dissolved in approximately 20 ml of water was added. This mixture was stirred for about two hours to give polymethylsilsesquioxane particles. The particle size distribution was analyzed using a Microtrac® ultrafine particle analyzer. The particle size distribution was 10% less than 0.6 $\mu$m, 50% less than 0.7 $\mu$m, and 90% less than 0.8 $\mu$m.

The invention has been described in detail with particular reference to preferred embodiments thereof, but it will be understood that variations and modifications can be effected within the spirit and scope of the invention.

What is claimed is:

1. A process for preparing polyalkylsilsesquioxane particles comprising:
   a) dissolving a sulfosuccinate surfactant in an alkyltrialkoxysilane or its partially hydrolyzed condensate;
   b) combining the mixture with water; and
   c) adding a basic material to the mixture to obtain said polyalkylsilsesquioxane particles, wherein said particles have a particle size distribution which is 10% less than 0.4 $\mu$m, 50% less than 0.6 $\mu$m, and 90% less than 0.8 $\mu$m.

2. The process of claim 1 wherein said alkyltrialkoxysilane is methyltrialkoxysilane.

3. The process of claim 2 wherein said methyltrialkoxysilane is methyltrimethoxysilane.

4. The process of claim 1 wherein said sulfosuccinate surfactant is a dioctyl ester of sodium sulfosuccinate.

5. The process of claim 1 wherein said basic material is a metal hydroxide or carbonate.

6. The process of claim 5 wherein said metal hydroxide is sodium hydroxide.

7. The process of claim 5 wherein said carbonate is sodium carbonate.

8. The process of claim 1 wherein said basic material is ammonia.

9. A process for preparing polyalkylsilsesquioxane particles comprising:
   a) dissolving a sulfosuccinate surfactant in an alkyltrialkoxysilane or its partially hydrolyzed condensate;
   b) combining the mixture with water; and
   c) adding a basic material to the mixture to obtain said polyalkylsilsesquioxane particles, wherein said particles have a particle size distribution which is 10% less than 2.6 $\mu$m, 50% less than 3.6 $\mu$m, and 90% less than 5.1 $\mu$m.

10. The process of claim 9 wherein said alkyltrialkoxysilane is methyltrialkoxysilane.

11. The process of claim 9 wherein said methyltrialkoxysilane is methyltrimethoxysilane.

12. The process of claim 9 wherein said sulfosuccinate surfactant is a dioctyl ester of sodium sulfosuccinate.

13. The process of claim 9 wherein said basic material is a metal hydroxide or carbonate.

14. The process of claim 9 wherein said basic material is ammonia.

15. A process for preparing polyalkylsilsesquioxane particles comprising:
   a) dissolving a sulfosuccinate surfactant in an alkyltrialkoxysilane or its partially hydrolyzed condensate;
   b) combining the mixture with water; and
   c) adding a basic material to the mixture to obtain said polyalkylsilsesquioxane particles, wherein said particles have a particle size distribution which is 10% less than 0.6 $\mu$m, 50% less than 0.7 $\mu$m, and 90% less than 0.8 $\mu$m.

16. The process of claim 15 wherein said alkyltrialkoxysilane is methyltrialkoxysilane.

17. The process of claim 16 wherein said methyltrialkoxysilane is methyltrimethoxysilane.

18. The process of claim 15 wherein said sulfosuccinate surfactant is a dioctyl ester of sodium sulfosuccinate.

19. The process of claim 15 wherein said basic material is a metal hydroxide or carbonate.

20. The process of claim 15 wherein said basic material is ammonia.

* * * * *